No. 819,571. PATENTED MAY 1, 1906.
M. MILCH.
ALTERNATING CURRENT MOTOR CONTROL.
APPLICATION FILED JAN. 15, 1904.

Witnesses:

Inventor,
Maurice Milch.
By Albert G. Davis
Att'y.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT-MOTOR CONTROL.

No. 819,571.     Specification of Letters Patent.     Patented May 1, 1906.

Application filed January 15, 1904. Serial No. 189,121.

*To all whom it may concern:*

Be it known that I, MAURICE MILCH, a subject of the Emperor of Austria-Hungary, residing at Schenectady, in the county of Schenectady and State of New York, have invented certain new and useful Improvements in Alternating-Current-Motor Control, of which the following is a specification.

My invention relates to alternating-current motors, and particularly to the type of alternating-current motor known as "repulsion." This type of motor possesses some of the characteristics of the direct-current series motor. It has a large starting torque with a good power factor and is consequently, like the direct-current series motor, well adapted for starting under load. As in the direct-current series motor, the torque decreases as the speed of the motor increases, theoretically becoming zero only at an indefinite speed. Consequently the motor is liable to race on light loads, and the torque at full speed or near synchronism is considerably less than at low speeds. The type of alternating-current motor, on the other hand, known as the "single-phase induction-motor" has no starting torque, but develops its maximum torque near synchronism. At synchronism the torque becomes zero and above synchronim reverses in direction. A torque characteristic similar to that of the induction-motor near synchronism can be obtained with a repulsion-motor by providing in addition to the usual short-circuited brushes other short-circuiting cross connections for the rotor-winding. This has the disadvantage, however, of lowering the starting torque and greatly increasing the starting-currents. The desired result can be obtained, however, without sacrificing the starting torque of the motor by so arranging the commutator-brushes and connections that at starting the rotor is short-circuited on a line at an angle to the line of the primary magnetization in the manner of the ordinary repulsion-motor and when the motor is up to speed closing the rotor-circuit on a second line at an angle to the first.

The object of my invention is to provide automatic means for closing the rotor-circuit on the second line controlled electromagnetically, so that it may be made responsive to variations in the motor-current or voltage for closing the circuit at the proper time.

My invention will best be understood by reference to the accompanying drawings, in which—

Figure 1:
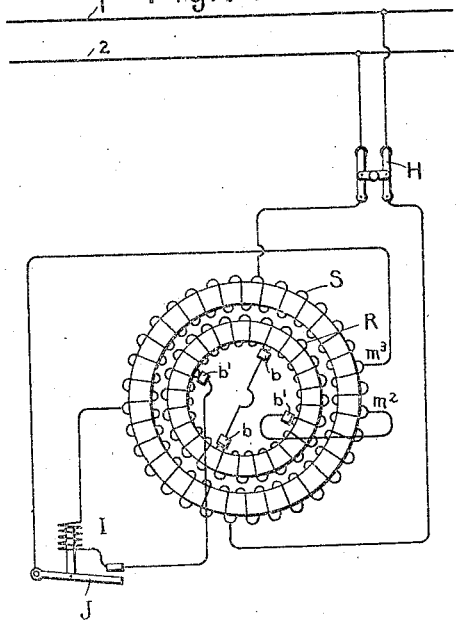
Figure 2:
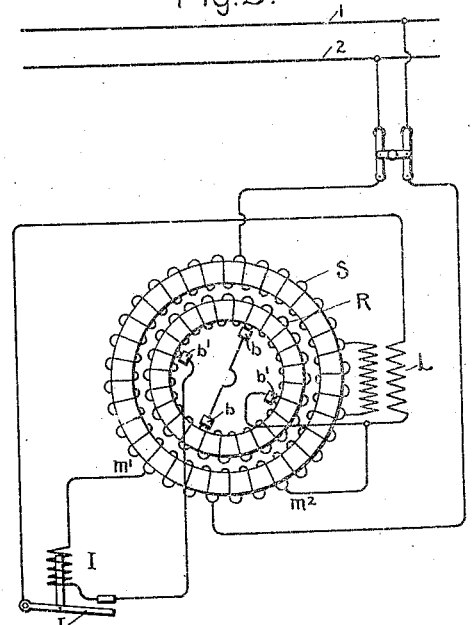

Figure 1 shows diametrically the circuits of the motor and automatic switch for closing the rotor-circuit on a line at an angle to the first when the motor is up to speed. Fig. 2 shows a modified arrangement of connections, and Fig. 3 is an explanatory diagram.

In Fig. 1, S represents the stator or primary member of a repulsion-motor having the primary terminals connected, through a switch H, to a source of single-phase current 1 2. R represents the rotor or secondary member supplied with the usual commutator-brushes $b$ $b$, short-circuited upon each other. The rotor is also supplied with an additional set of brushes $b'$ $b'$, displaced approximately ninety electrical degrees from the first set. It is evident that as long as the brushes $b'$ $b'$ are open-circuited the motor acts as a simple repulsion-motor.

Figure 3:
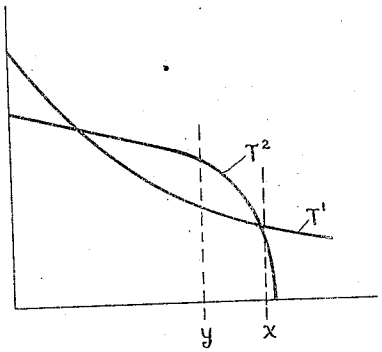

Referring now to Fig. 3, I have shown two curves, one, $T'$, representing the torque-curve of an ordinary repulsion-motor, the other, $T^2$, representing the torque-curve of a repulsion-motor with additional cross connections, such as would be the case with the motor of Fig. 1 if brushes $b'$ $b'$ were short-circuited. The curve $T^2$ shows the lower torque at starting, the higher torque near synchronism, (indicated by the dotted line $x$,) and the reversal of torque just above synchronism. It will be understood from these curves that if the motor is running at any point on the torque-curve $T'$ and the second set of brushes $b'$ $b'$ is short-circuited the torque will rise or fall to the amount indicated by the point on the curve $T^2$ vertically above or below, as the case may be. Thus if the motor should be running with a speed and torque indicated by the point of intersection of the dotted line $y$ with curve $T'$ and if brushes $b'$ $b'$ are then short-circuited the torque will instantaneously rise to the value indicated by the point on curve $T^2$ at its intersection with line $y$. Furthermore, if the brushes $b'$ $b'$ are short-circuited when the motor is running with a speed at which the two torque-curves are close together no shock upon the motor by a sudden rush of current will be produced.

Referring now to Fig. 1, I shall describe an arrangement for automatically closing the circuit of the brushes $b'$ $b'$ when the motor reaches the proper speed.

It will be seen from the drawings that the brushes $b'$ $b'$ are connected, through the magnet-winding I, to points on the stator-winding nearly diametrically opposite each other. At starting the sections of the stator-winding between these points of connection are subjected to practically the same cross-magnetizing flux to which the parts of the rotor-winding between the brushes $b'$ $b'$ are subjected, and consequently the induced electromotive force in both windings will be approximately equal. Consequently little or no current will flow through the circuit and magnet-winding I will not be energized. As the motor speeds up a voltage is induced in the parts of the rotor-winding between the brushes $b'$ $b'$ which is in opposition to the voltage induced by the transformer action at the start. The resultant voltage at brushes $b'$ $b'$ is consequently diminished. The electromotive force induced in the primary winding at the points connected to these brushes will consequently overpower the voltage induced in the rotor-winding at these brushes. A current will consequently flow, energizing the magnet-winding I, which draws up the switch member J, short-circuiting brushes $b'$ $b'$ across the section of the primary winding between the taps $m^2$ and $m^3$. The change is thus accomplished automatically when the motor reaches a certain speed. The automatic switch instead of directly short-circuiting the brushes thus connects them to a portion of the primary winding between the taps $m^2$ and $m^3$, which acts to supply a compensating voltage to the rotor which improves the power factor and efficiency of the motor. The torque characteristic is not materially affected by the compensating voltage, and if compensation is not desired the brushes $b'$ $b'$ may be directly short-circuited.

If the ratio of stator to rotor turns is other than one to one, the brushes $b'$ $b'$ should not be connected to diametrically opposite points of the stator-winding, but to a smaller part of the stator-winding, according to the ratio of turns of the two windings, or the proper voltage ratio may be obtained through a transformer. Thus in Fig. 2 the brushes $b'$ $b'$ are connected through the magnet-winding I to two taps $m'$ $m^2$ on the stator-winding displaced from each other considerably less than one hundred and eighty degrees. At full speed the brushes $b'$ $b'$ are short-circuited through the secondary of a transformer L instead of being connected directly in shunt to a section of the stator-winding.

Although I have shown for the sake of simplicity a bipolar motor having Gramme ring-windings on both members, it will be understood that my invention is applicable to a motor having any number of poles and any well-known form of winding on its members. Furthermore, although I have shown only a single motor it is evident that any number of motors may be connected to and controlled by a single controlling-switch, as in the case of a plurality of motors upon a car or train. Also although I have shown none of the well-known means for reducing the starting-current of repulsion-motors it will be understood that my invention does not exclude the use of such means. Any well-known starting device, such as reducing the voltage impressed on the primary, may be employed in conjunction with my system of control, if desired. Accordingly I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. In combination, in an alternating-current motor, a rotor-winding provided with a commutator, brushes short-circuiting the rotor-winding on a line displaced from the line of magnetization of the primary member, a switch adapted to close the rotor-circuit on a second line at an angle to the first, and electromagnetic controlling means adapted to operate said switch when the motor is up to speed.

2. In combination, in an alternating-current motor, a rotor-winding provided with a commutator, brushes short-circuiting the rotor-winding on a line displaced from the line of magnetization of the primary member, a switch adapted to close the rotor-circuit on a second line at an angle to the first, and a magnet-winding connected to said brushes and controlling said switch.

3. In combination, in an alternating-current motor, a rotor-winding provided with a commutator, brushes short-circuiting the rotor-winding on a line displaced from the line of magnetization of the primary member, a switch adapted to close the rotor-circuit through a source of compensating electromotive force on a second line at an angle to the first, and a magnet-winding connected to said brushes and controlling said switch.

4. In combination, in an alternating-current motor, a rotor-winding provided with a commutator, brushes short-circuiting the rotor-winding on a line displaced from the line of magnetization of the primary member, a switch adapted to close the rotor-circuit through a source of compensating electromotive force on a second line at an angle to the first, and electromagnetic controlling means adapted to operate said switch when the motor is up to speed.

5. In combination, a repulsion-motor having two sets of commutator-brushes, said sets being displaced from each other by approximately ninety electrical degrees and both sets being displaced from the line of magnetization of the primary member, means for short-circuiting one set, and a switch operative upon a decrease of potential between the brushes of the second set to close a circuit between said brushes.

6. In combination, a repulsion-motor having two sets of commutator-brushes, said sets being displaced from each other by approximately ninety electrical degrees and both sets being displaced from the line of magnetization of the primary member, means for short-circuiting one set, and a switch operative upon a decrease of potential between the brushes of the second set to close a circuit between said brushes, through a source of compensating electromotive force.

7. In combination, a repulsion-motor having two sets of commutator-brushes, said sets being displaced from each other by approximately ninety electrical degrees, and both sets being displaced from the line of magnetization of the primary member, means for short-circuiting one set, a switch adapted to close a circuit between the brushes of the second set, and a magnet-winding controlling said switch and connected in circuit with the brushes of the second set.

8. In combination, a repulsion-motor having two sets of commutator-brushes, said sets being displaced by approximately ninety electrical degrees and both sets being displaced from the line of magnetization of the primary member, means for short-circuiting one set, a switch in circuit with the brushes of the second set, and means responsive to voltage variations in the motor for closing said switch.

9. In combination, a repulsion-motor having two sets of commutator-brushes, said sets being displaced by approximately ninety electrical degrees and both sets being displaced from the line of magnetization of the primary member, means for short-circuiting one set, a switch in circuit with the brushes of the second set, and an electromagnet for operating said switch, the winding of the said magnet being included in circuit with said second set of brushes through a winding on the primary member of the motor.

10. In combination, a repulsion-motor having two sets of commutator-brushes, said sets being displaced by approximately ninety electrical degrees and both sets being displaced from the line of magnetization of the primary member, means for short-circuiting one set, a switch in circuit with the brushes of the second set, and an electromagnet for operating said switch, the winding of said magnet being included in circuit with the said second set of brushes through all or a portion of the primary winding of the motor, the connections to the primary winding being made along a line corresponding substantially to the line of the second set of brushes.

In witness whereof I have hereunto set my hand this 14th day of January, 1904.

MAURICE MILCH.

Witnesses:
BENJAMIN B. HULL,
HELEN ORFORD.